(12) United States Patent
Cao et al.

(10) Patent No.: US 12,241,445 B2
(45) Date of Patent: Mar. 4, 2025

(54) HYBRID TRIBOELECTRIC AND ELECTROMAGNETIC GENERATOR

(71) Applicant: Board of Trustees of Michigan State University, East Lansing, MI (US)

(72) Inventors: Changyong Cao, Okemos, MI (US); Yaokun Pang, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 353 days.

(21) Appl. No.: 17/706,860

(22) Filed: Mar. 29, 2022

(65) Prior Publication Data
US 2022/0316439 A1    Oct. 6, 2022

Related U.S. Application Data

(60) Provisional application No. 63/170,639, filed on Apr. 5, 2021.

(51) Int. Cl.
*F03B 13/16* (2006.01)
*H02N 1/04* (2006.01)

(52) U.S. Cl.
CPC ............... *F03B 13/16* (2013.01); *H02N 1/04* (2013.01); *F05B 2220/706* (2013.01)

(58) Field of Classification Search
CPC . F03B 13/16; F03B 13/20; H02N 1/04; F05B 2220/706; F05B 2220/7068; F05B 2220/707; F05B 2240/40; F05B 2240/95; F05B 2240/965; F05B 2250/44; H02K 35/02

See application file for complete search history.

(56) References Cited

U.S. PATENT DOCUMENTS

| 4,990,813 A | 2/1991 | Paramo |
| 8,022,563 B2 | 9/2011 | Lemieux |

(Continued)

FOREIGN PATENT DOCUMENTS

| KR | 2016-0148755 A | 12/2016 |
| KR | 10-1727242 B1 | 4/2017 |

(Continued)

OTHER PUBLICATIONS

KR20160148755A English translation (Year: 2024).*

(Continued)

*Primary Examiner* — Christopher M Koehler
*Assistant Examiner* — Viswanathan Subramanian
(74) *Attorney, Agent, or Firm* — Harness, Dickey & Pierce, PLC

(57) ABSTRACT

A power generator or sensor apparatus is provided. Another aspect employs a hybrid triboelectric and electromagnetic generator. In still another aspect, a power generator is used for water wave energy harvesting. A further aspect provides a power generator including an outer housing with an electrical conductor on an exterior thereof, radial overlapping electrodes located within the housing with a dielectric layer between the electrodes, a plate linearly moveable within the housing, at least one magnet affixed to the plate, and at least one spring biasing the plate within the housing. Moreover, an aspect of the present power generator includes a modularized connection configuration to linearly secure together multiples of the housing.

20 Claims, 6 Drawing Sheets

(56) References Cited

U.S. PATENT DOCUMENTS

| | | | |
|---|---|---|---|
| 9,394,875 B2 | 7/2016 | Wang et al. | |
| 9,394,876 B2 | 7/2016 | Zuo et al. | |
| 9,543,860 B2 | 1/2017 | Wang et al. | |
| 9,571,009 B2 | 2/2017 | Wang et al. | |
| 10,574,155 B2 | 2/2020 | Song et al. | |
| 2006/0266038 A1* | 11/2006 | Krouse | F03B 17/061 |
| | | | 60/641.7 |
| 2008/0174281 A1* | 7/2008 | Shau | H02N 11/002 |
| | | | 322/1 |
| 2013/0222115 A1 | 8/2013 | Davoodi et al. | |
| 2014/0111061 A1* | 4/2014 | Yamakawa | H02N 1/08 |
| | | | 310/300 |
| 2016/0218640 A1 | 7/2016 | Wang et al. | |
| 2020/0374604 A1 | 11/2020 | Park et al. | |
| 2021/0211072 A1 | 7/2021 | Cao et al. | |

FOREIGN PATENT DOCUMENTS

| | | |
|---|---|---|
| KR | 2017-0043243 A | 4/2017 |
| KR | 2020-0005296 A | 1/2020 |
| WO | WO-2019-020204 | 1/2019 |
| WO | WO-2019-032217 | 2/2019 |

OTHER PUBLICATIONS

Chen, et al., "Bladeless-Turbine-Based Triboelectric Nanogenerator for Fluid Energy Harvesting and Self-Powered Fluid Gauge," Advanced Materials Technologies 1800560 (2018).

Gong, et al., "Capturing Flow Energy From Ocean And Wind," MDPI Energies Review (2019).

Hu, et al., "Recent progress in piezotronics and tribotronics," Nanotechnology 30 (2019).

Jiang, et al., "Structural Optimization of Triboelectric Nanogenerator for Harvesting Water Wave Energy," ACS Nano, 9, 12, (Nov. 14, 2015) 12562-12572.

Jiang, et al., "Spring-assisted triboelectric nanogenerator for efficiently harvesting water wave energy," Nano Energy 31 (2017) pp. 560-567.

Lee, et al., "A Spherical Hybrid Triboelectric Nanogenerator for Enhanced Water Wave Energy Harvesting," MDPI Micromachines (2018) 9, 598.

Lin, et al., "A Triboelectric Nanogenerator-Based Smart Insole For Multifunctional Gait Monitoring," Advanced Materials Technologies, (2018) 1800360.

Nie, et al., "Electrically Responsive Materials and Devices Directly Driven by the High Voltage of Triboelectric Nanogenerators," Advanced Functional Materials, Triboelectric Nanogenerators Review, (2018) 1806351.

Quin, et al., "High Energy Storage Efficiency Triboelectric Nanogenerators with Unidirectional Switches and Passive Power Management Circuits," Advanced Functional Materials, (2018) 1805216.

Tian, et al., "A Shared-Electrode and Nested-Tube Structure Triboelectric Nanogenerator for Motion Energy Harvesting," MDPI Micromachines, (2019) 10, 656.

Wang, et al., "Sustainably power wearable electronics solely by biomechanical energy," Nature Communications (Sep. 28, 2016).

Wang, et al., "Toward the blue energy dream by triboelectric nanogenerator networks," Nano Energy 38 (2017) 9-23.

Wu, et al., "Triboelectric Nanogenerator: A Foundation of the Energy for the New Era," Advanced Energy Materials, (2018) 1802906.

Xu, et al., "A highly-sensitive wave sensor based on liquid-solid interfacing triboelectric nanogenerator for smart marine equipment," Nano Energy (2018).

Yin, et al., "Structure and Dimension Effects on the Performance of Layered Triboelectric Nanogenerators in Contact-Separation Mode," ACS Nano (Dec. 24, 2018).

Yong, et al., "Highly reliable wind-rolling triboelectric nanogenerator operating in a wide wind speed range," www.nature.com/ScientificReports, 6:33977, DOI: 10.1038/srep33977 (Jun. 10, 2016).

Wang, et al., "An Ultra-Low-Friction Triboelectric-Electromagnetic Hybrid Nanogenerator for Rotation Energy Harvesting and Self-Powered Wind Speed Sensor," ACS Nano (2018) 12, 9433-9440.

Wu, et al., "A Hybridized Triboelectric-Electromagnetic Water Wave Energy Harvester Based on a Magnetic Sphere," ACS Nano article, (2019) 13, 2349-2356.

Pang, et al., "Matryoshka-inspired Hierarchically Structured Triboelectric Nanogenerators for Wave Engergy Harvesting," Elsevier, Nano Energy, vol. 66 (Dec. 2019).

Pang, et al., "Multilayered Cylindrical Triboelectric Nanogenerator to Harvest Kinetic Energy of Tree Branches for Monitoring Environment Condition and Forest Fire," Advanced Functional Materials (2020).

Fu, et al., "Embedded Triboelectric Active Sensors for Real-Time Pneumatic Monitoring," ACS Applied Material Interfaces (2017), vol. 9, p. 32352-32358.

* cited by examiner

HYBRID TRIBOELECTRIC AND ELECTROMAGNETIC GENERATOR

CROSS-REFERENCE TO RELATED APPLICATION

The present application claims priority to U.S. provisional patent application Ser. No. 63/170,639, filed on Apr. 5, 2021, which is incorporated by reference herein.

GOVERNMENT SUPPORT

This invention was made with government support under 1016788 awarded by the U.S. Department of Agriculture. The government has certain rights in the invention.

BACKGROUND AND SUMMARY

The present disclosure generally pertains to power generators, and more particularly to a hybrid power generator apparatus for water wave energy harvesting.

Ocean wave energy has many promising advantages like high power density, wide distribution and independence of time of day, weather or seasons. It is estimated that the global power by waves breaking around the coastlines worldwide is around 2-3 TW. However, developing effective energy harvesting devices that can reliably extract that energy and withstand the ocean environment is challenging, and up to now there is still a lack of cost-effective energy harvesting technologies to exploit this renewable energy resource.

Over the years, different kinds of energy harvesters have been attempted to capture the energy from ocean tides or ocean waves based on electro-magnetic generators ("EMGs"). These conventional devices, however, exhibit low energy harvesting efficiency at low ocean wave frequencies and have the drawbacks of complex design, high cost and corrosion in seawater. Therefore, the development of a new kind of low-cost, robust and highly efficient wave energy harvester is desirable for harvesting energy especially from low-frequency water waves.

More recently, triboelectric nanogenerators ("TENGs") have been experimented with for converting mechanical energy into electricity based on the coupled effect of triboelectrification and electrostatic induction. Compared with traditional EMGs, TENGs are advantageous for ocean wave energy harvesting due to their superior efficiency in capturing low-frequency (<3 Hz) wave energy as well as low-cost and simplicity in installation of the devices. Examples of experimental TENGs can be found in: Y. Pang and C. Cao et al., "Matryoshka-Inspired Hierarchically Structured Triboelectric Nanogenerators for Wave Energy Harvesting," Nano Energy, vol. 66, 104131 (Sep. 28, 2019); Z. Wu et al., "A Hybridized Triboelectric-Electromagnetic Water Wave Energy Harvester Based on a Magnetic Sphere," ACS Nano, vol. 13, 2349 (Jan. 25, 2019); U.S. Patent Publication No. 2020/0374604 entitled "Sensor Device and Electronic Device" which published to Park et al., on Nov. 26, 2020; and U.S. Patent Publication No. 2013/0222115 entitled "Autonomous and Controllable Systems of Sensors and Methods of Using Such Systems" which published to Davoodi et al. on Aug. 29, 2013. The preceding patent publications are incorporated by reference herein. However, some of these previous TENG experiments utilize only unidirectional motion to generate electricity and some of these devices are of a spherical external shape which are not well suited for modularized attachment.

In accordance with the present invention, a power generator or sensor apparatus is provided. Another aspect employs a hybrid triboelectric and electromagnetic generator. In still another aspect, a power generator is used for water wave energy harvesting. A further aspect provides a power generator including a buoyant, waterproof and/or enclosed outer housing with an electrical conductor on an exterior thereof, radial overlapping electrodes located within the housing with a dielectric layer between the electrodes, a transversely oriented plate linearly moveable within the housing, at least one magnet affixed to the plate, and at least one spring biasing the plate within the housing. Moreover, an aspect of the present power generator includes a modularized connection configuration to linearly secure together multiples of the housing to generate increased triboelectric charging or energy while maximizing externally induced movement of the elongated modular assembly. Methods of manufacturing and using a hybrid triboelectric and electromagnetic generator, are also provided.

The present apparatus is advantageous over conventional devices since the present apparatus more efficiently generates electrical charges or energy, especially at low-frequency wave motions. Furthermore, the present apparatus advantageously maximizes energy generation and sensing within a small packaging area by employing both overlapping electrodes and magnets. Moreover, it is also envisioned that the present apparatus is more cost effective to manufacture and has a lighter weight as compared to various traditional devices. The present hybrid design beneficially combines low voltage and moderate electrical current from the electromagnetic generator portion with high voltage and low electrical current from the triboelectric generator portion. It is also advantageous that the present hybrid apparatus can respond to a wide range of frequencies and amplitudes, especially as compared to many conventional constructions. Additional features and advantageous of the present apparatus will become apparent from the following description and appended claims taken in conjunction with the associated drawings.

DETAILED DESCRIPTION

Figure 1:
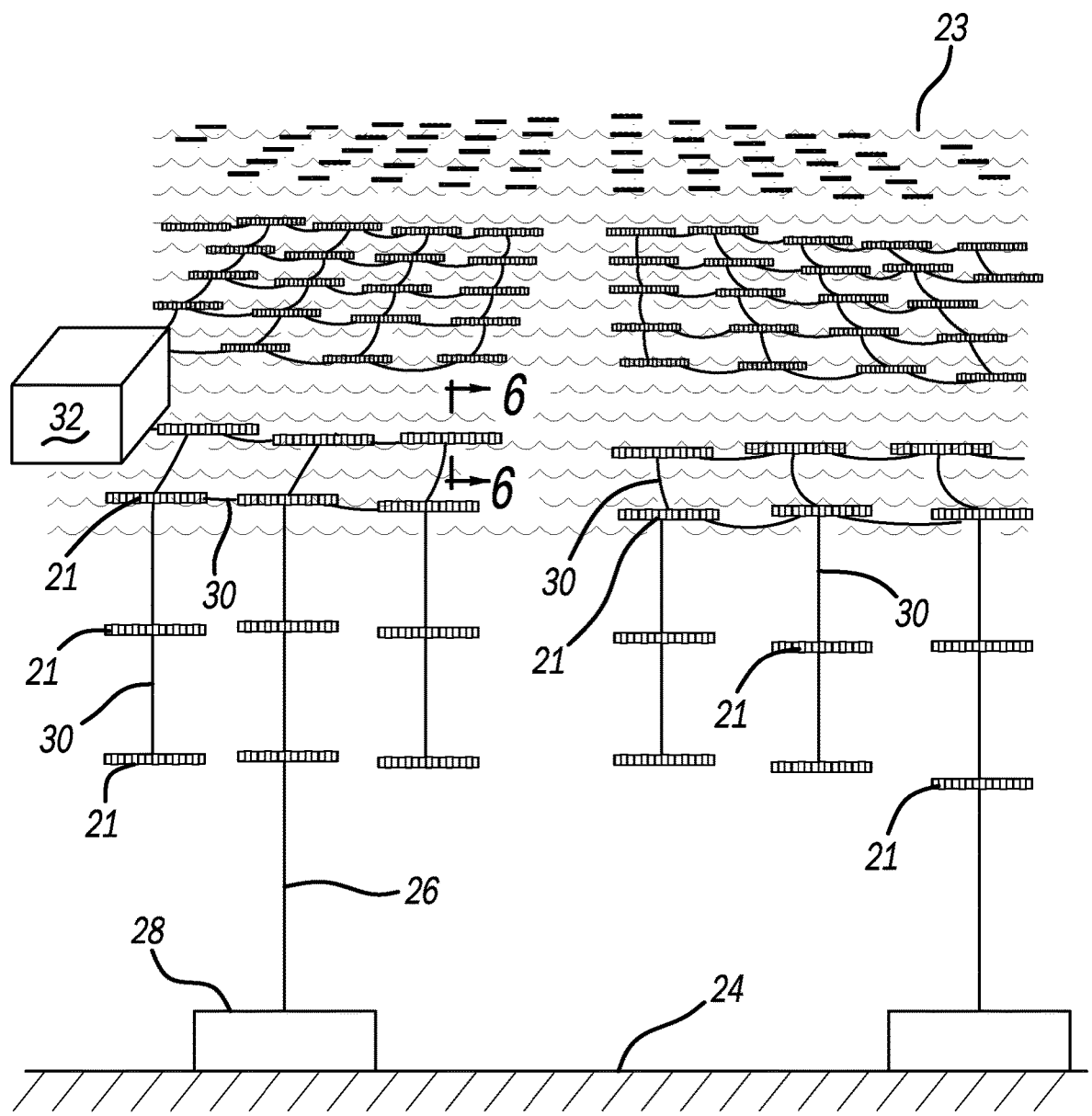
FIG. 1 is a diagrammatic perspective view showing the present power generator apparatus for water wave energy harvesting.

A preferred embodiment of a hybrid triboelectric and electromagnetic nanogenerator ("EM-TENG") apparatus 21 is employed for energy harvesting in ocean or lake water waves 23, as can be observed in FIG. 1. A three-dimensional array of EM-TENG apparatuses 21 float on top of and/or are partially or fully submerged in the water, and are moored to a floor 24 by cables 26 and an anchor block 28. Electrical lines 30 connect adjacent EM-TENG apparatuses 21 and also the apparatuses to a power storage or transmission unit 32.

Figure 2:
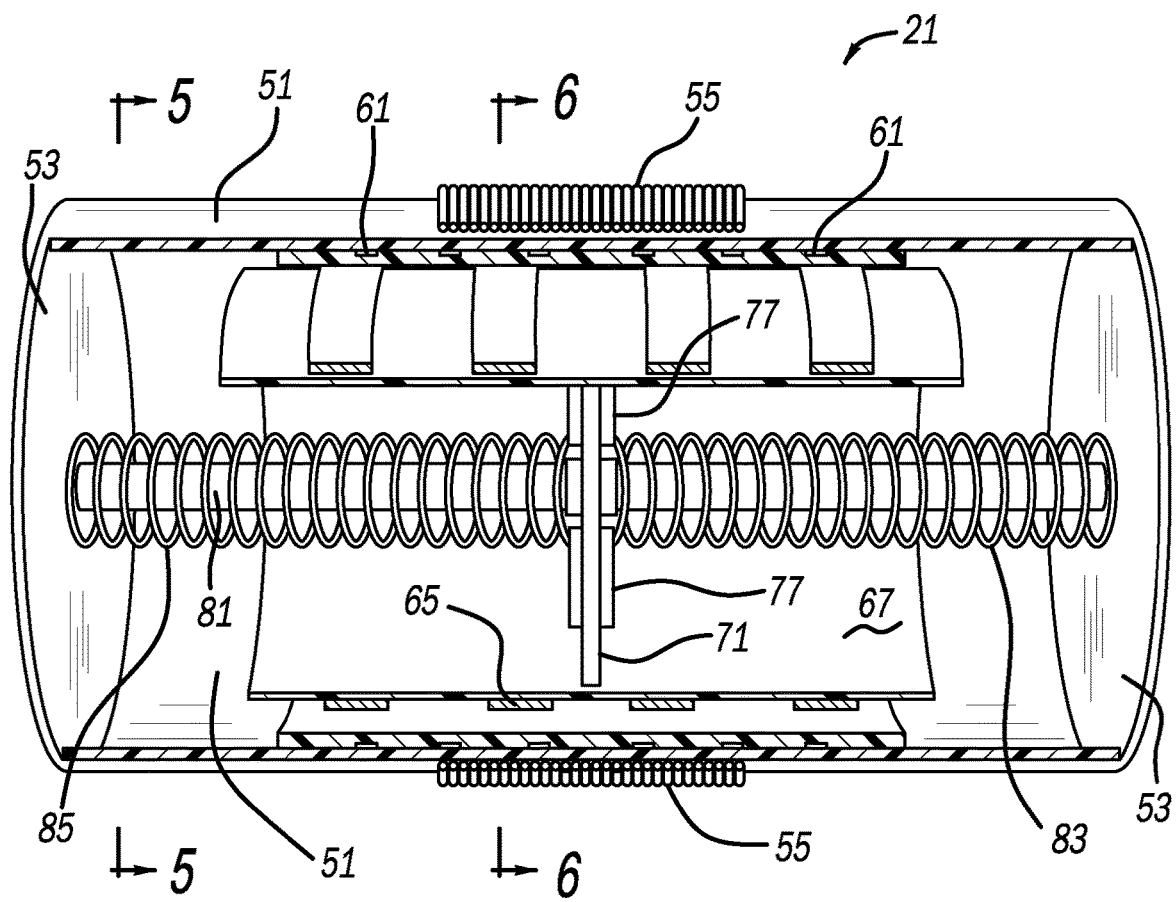
FIG. 2 is a fragmentary perspective view showing a nominal position of the present apparatus.
Figure 3:
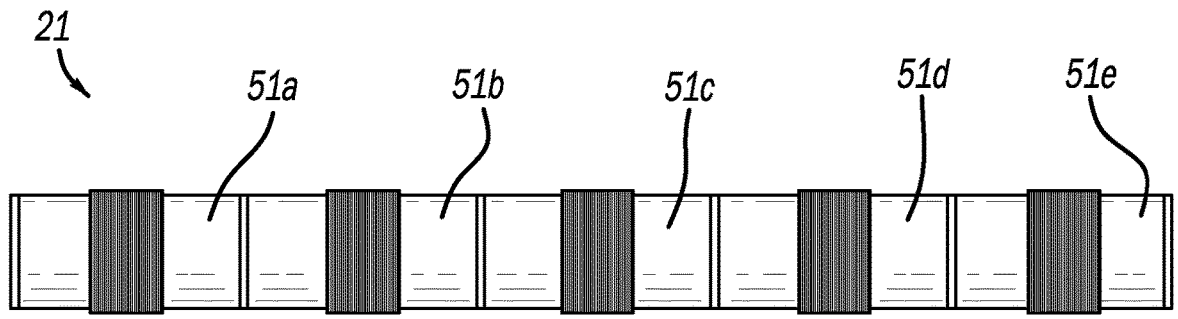
FIG. 3 is a side elevational view showing a modularized assembly of the present apparatus.

Referring now to FIG. 2, EM-TENG apparatus 21 preferably includes an enclosed and buoyant outer housing 51 made from a generally rigid polymeric and electrically insulating material such as ABS or the like. Housing 51 has a generally cylindrical shape, elongated in a longitudinal direction, and has a longitudinal length of about 2-10 cm between its end walls 53. EM-TENG apparatus 21 is constructed in a modularized manner such that multiples of housing 51 can be coupled together in a linear and longitudinally stacked column as is illustrated in FIG. 3. At least three and more preferably, at least five, housings 51a-e have their end walls 53 attached together by rivets, screws, or adhesive. The extending column length is more sensitive to externally induced movement than would otherwise occur with a single housing.

Figure 4:
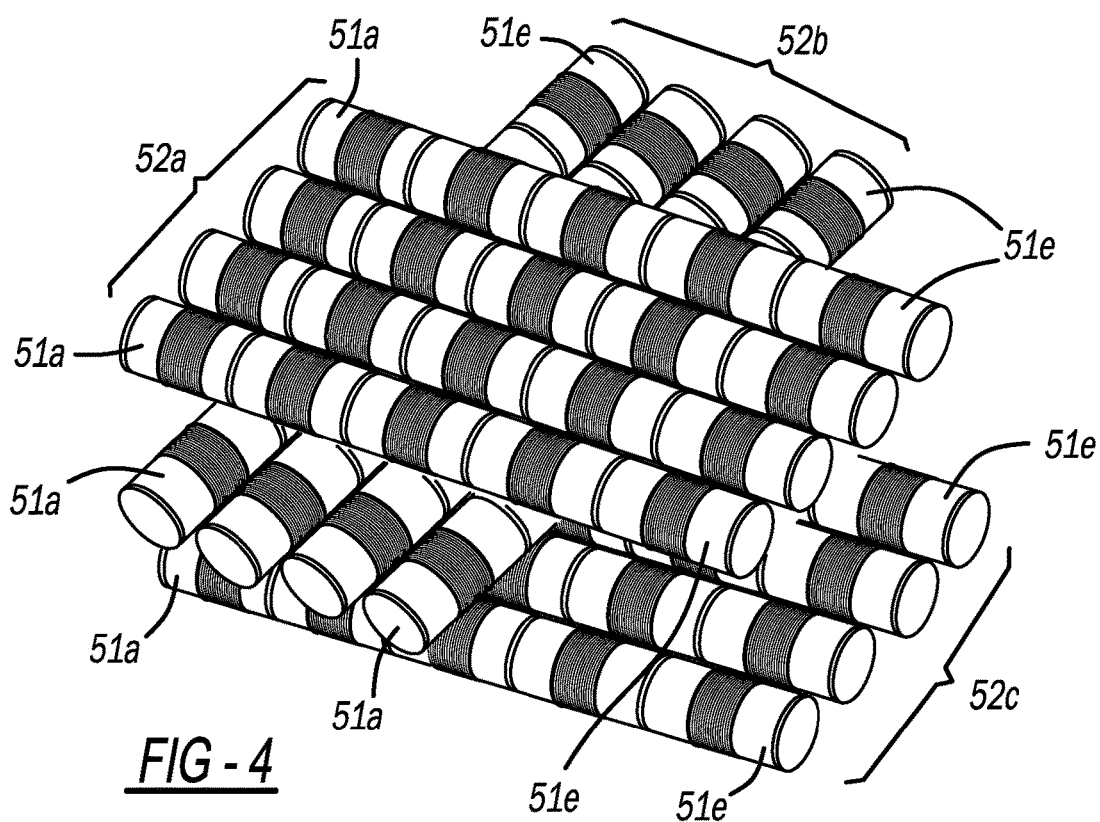
FIG. 4 is a perspective view showing a multilayer and multidirectional arrangement of the modularized assembly of the present apparatus.

Furthermore, FIG. 4 shows an optional construction where multiple parallel bundles of the modularized assemblies of stacked housings 51a-e are transversely stacked in at least three offset angled layers or bundles 52a-c. Each bundle is coupled together by external straps, riveted brackets, screwed cross-members or the like. The electrical circuitry can be redundant for each housing (in case one is damaged) or may be synergistically combined in a unified manner for a linear column or the entire multi-dimensional layers. This multi-dimensional stacking provides additional sensitivity to changing wave movements and directions.

Figure 5:
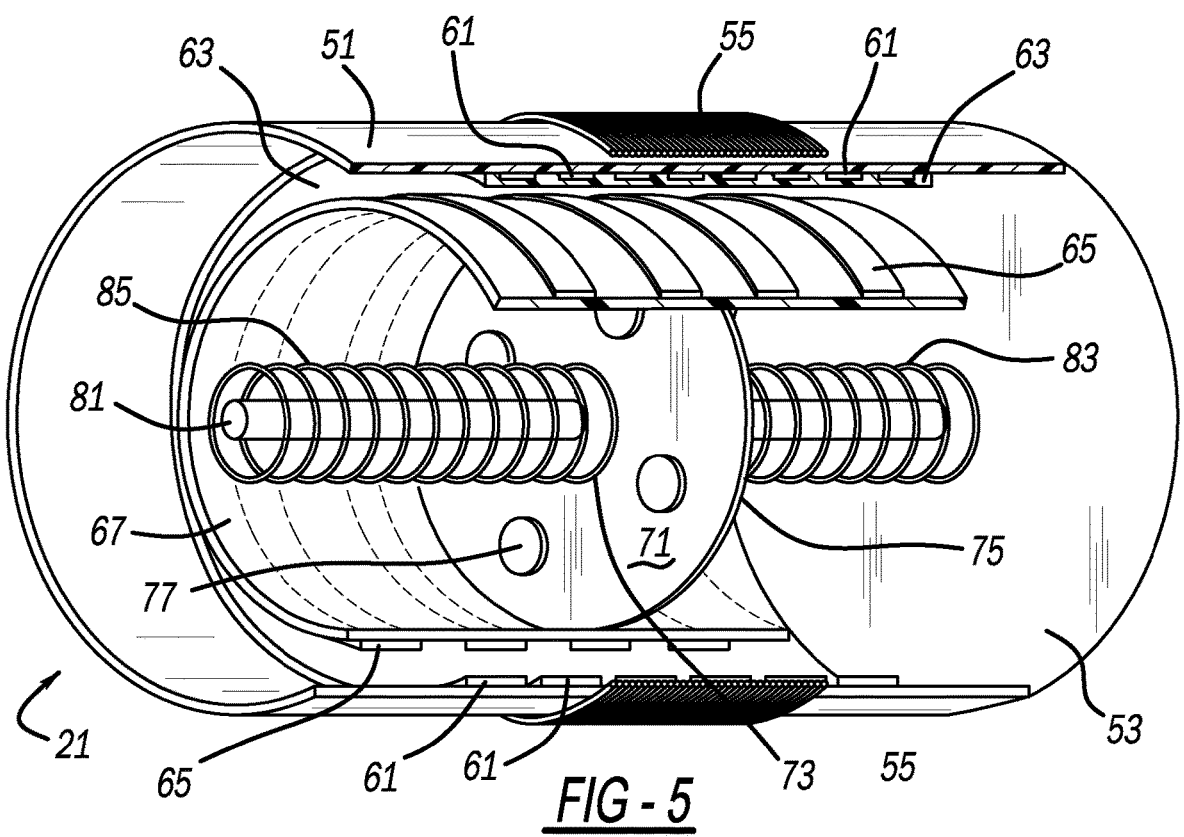
FIG. 5 is a partially fragmented and perspective view, taken along line 5-5 of FIG. 2, showing the present apparatus.
Figure 6:
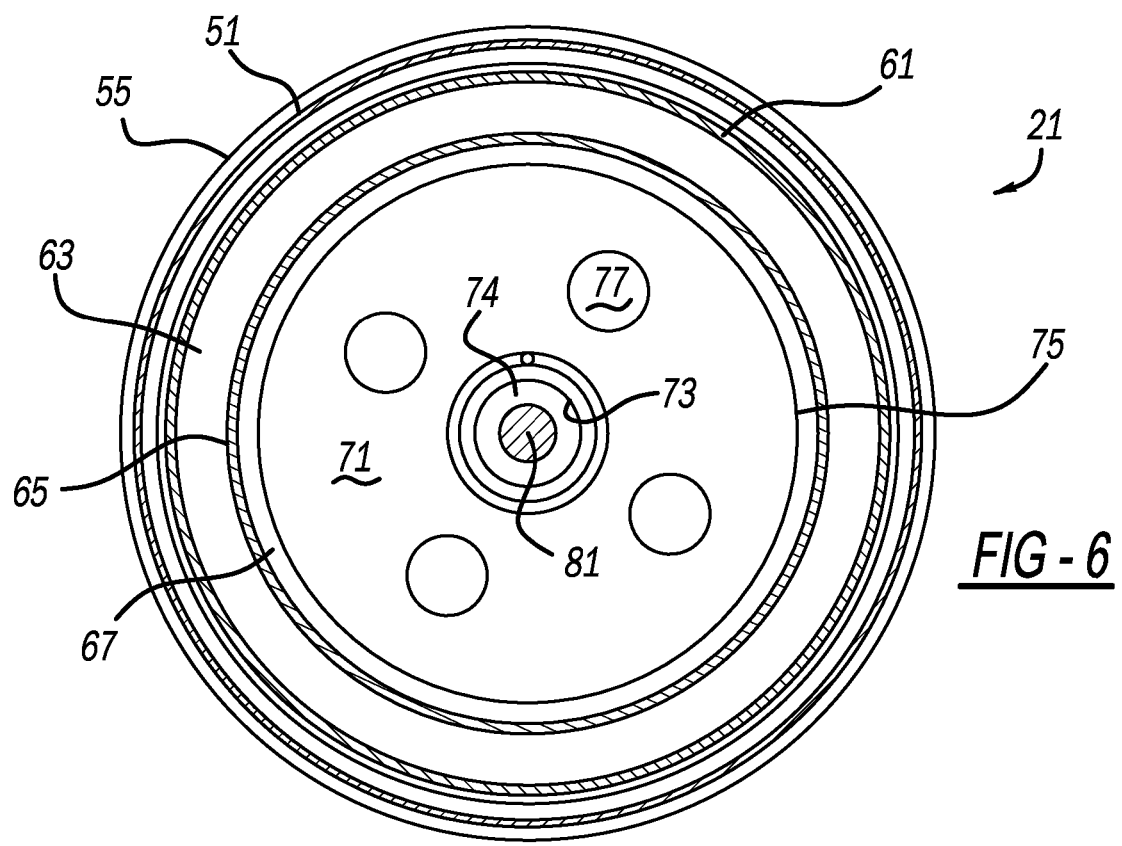
FIG. 6 is a cross-sectional view, taken along line 6-6 of FIG. 2, showing the present apparatus.

As can be observed in FIGS. 2, 5 and 6, an electrically conductive wire winding 55 is concentrically mounted to an exterior surface of housing 51 and encased within a non-conductive and protective paint coating. Alternately, a single, longitudinally wide and annular conductive, copper strip can be mounted to the housing instead of the wire winding. Multiple coaxial, annular bands of conductive copper electrodes 61 are stationarily affixed to an internal surface of housing 51 with a dielectric polymeric layer or sheet 63 secured to an inner surface of electrodes 61. There are preferably at least three spaced apart electrodes 61 and more preferably eight. Optionally, dielectric sheet 63 may also be located on the longitudinal side edges of electrodes 61 to electrically insulate therebetween. The dielectric sheet is preferably made of a poly-tetrafluoroethylene ("PTFE") material.

Multiple coaxial, annular bands of conductive copper electrodes 65 are mounted to an outer surface of a rigid polymeric collar 67, preferably of a cylindrical shape made from an electrically insulating ABS material. There are preferably at least three spaced apart electrodes 65 and more preferably four. Each electrode 65 has the same longitudinal length with the surrounding electrode 61, all of which are each longitudinally narrower than the surrounding wire winding 55. Collar 67 and its attached electrodes 65 are configured to longitudinally move in a linear direction relative to the fixed electrodes 61.

A plate 71 is a polymeric disc which laterally extends from a central hole 73 to a circular peripheral edge 75. Collar 67 is mounted to edge 75 of plate 71, such as through an adhesive, snap fit, or similar fastener, such that the collar and plate longitudinally move together. Furthermore, multiple spaced apart permanent magnets 77 are coupled to plate 71 and extend through apertures therein which are radially transverse and spaced between central hole 73 and edge 75. There are at least two and more preferably four magnets 77. One longitudinal side of each magnet is the North end and the opposite side is the South end, all magnets having the same polarized orientation. In one nonlimiting example, the magnets have a collective strength of about 1-500 mT and more preferably 1-100 mT, depending on the spring forces employed.

A longitudinally elongated shaft 81 is attached to end walls 53 of housing 51 and extend through central hole 73. Plate 71 is fixed on a bearing 74 at its center and is slidable along the shaft. Moreover, compression springs 83 and 85 are positioned between plate 71 and the adjacent end wall 53, helically surrounding shaft 81. Thus, springs 83 and 85 bias and urge plate 71 toward a longitudinally central and nominal position (see FIG. 2) away from the end walls. The springs each have a compression force of about 0.1-1.0 Newtons depending on the magnet strength.

Figure 9:
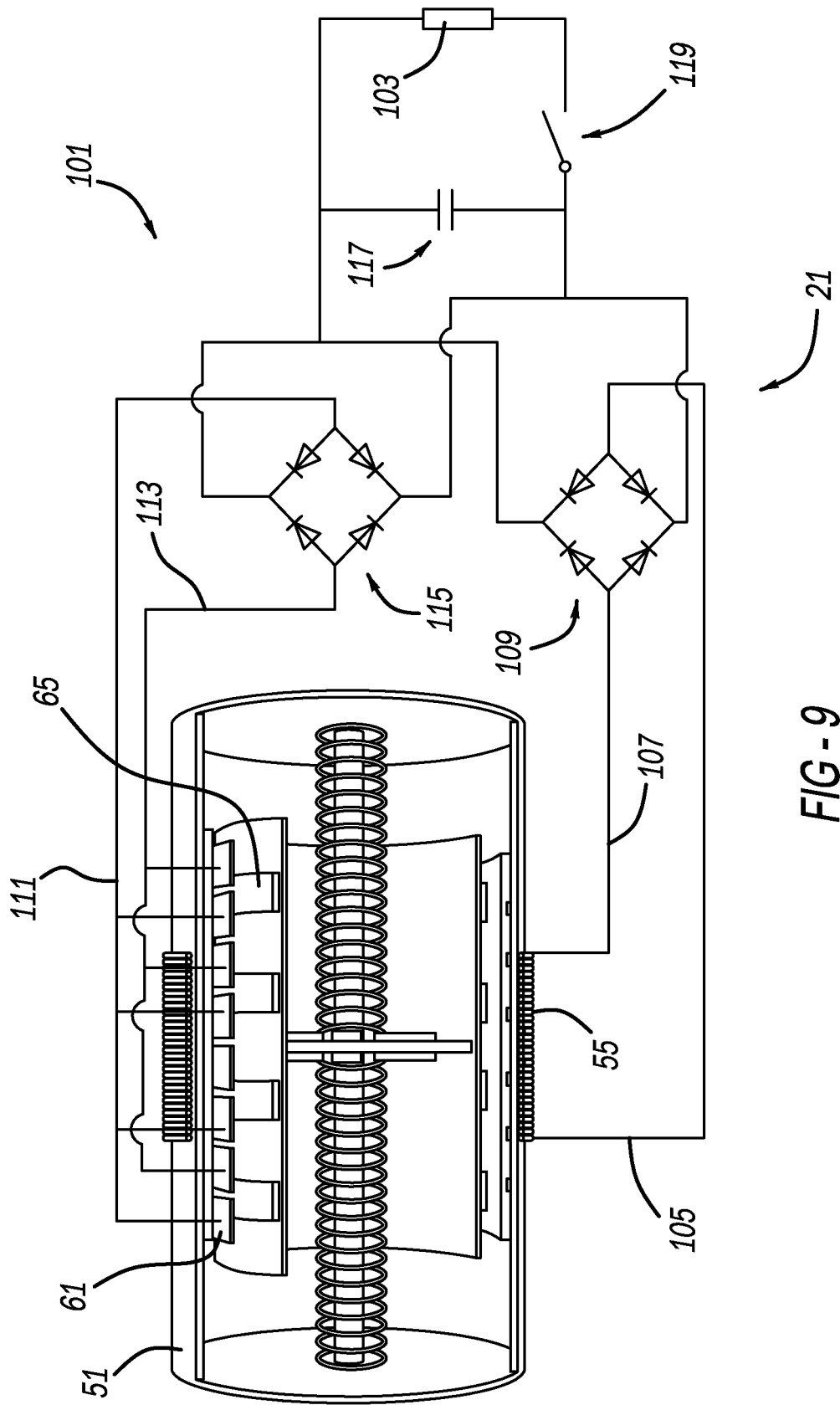
FIG. 9 is an electrical diagram of the present apparatus.

Reference should now be made to FIG. 9. An electrical circuit 101 couples the components of each housing 51 to a local output 103 which may optionally be coupled to storage unit 32 via transmission lines 30 (see FIG. 1) if in an arrayed power grid network. Alternately, local output 103 may be an LED light or wireless transmitter. First and second lines 105 and 107, respectively, of circuit 101 are connected to the opposite ends of wire windings 55, and connect to an AC-DC converter 109 including multiple diodes. Third and fourth lines 111 and 113, respectively, of circuit 101 alternately connect stationary electrodes 61 to an AC-DC converter 115 including multiple diodes. A capacitor 117 and switch 119 are also part of the circuit.

Figure 7:
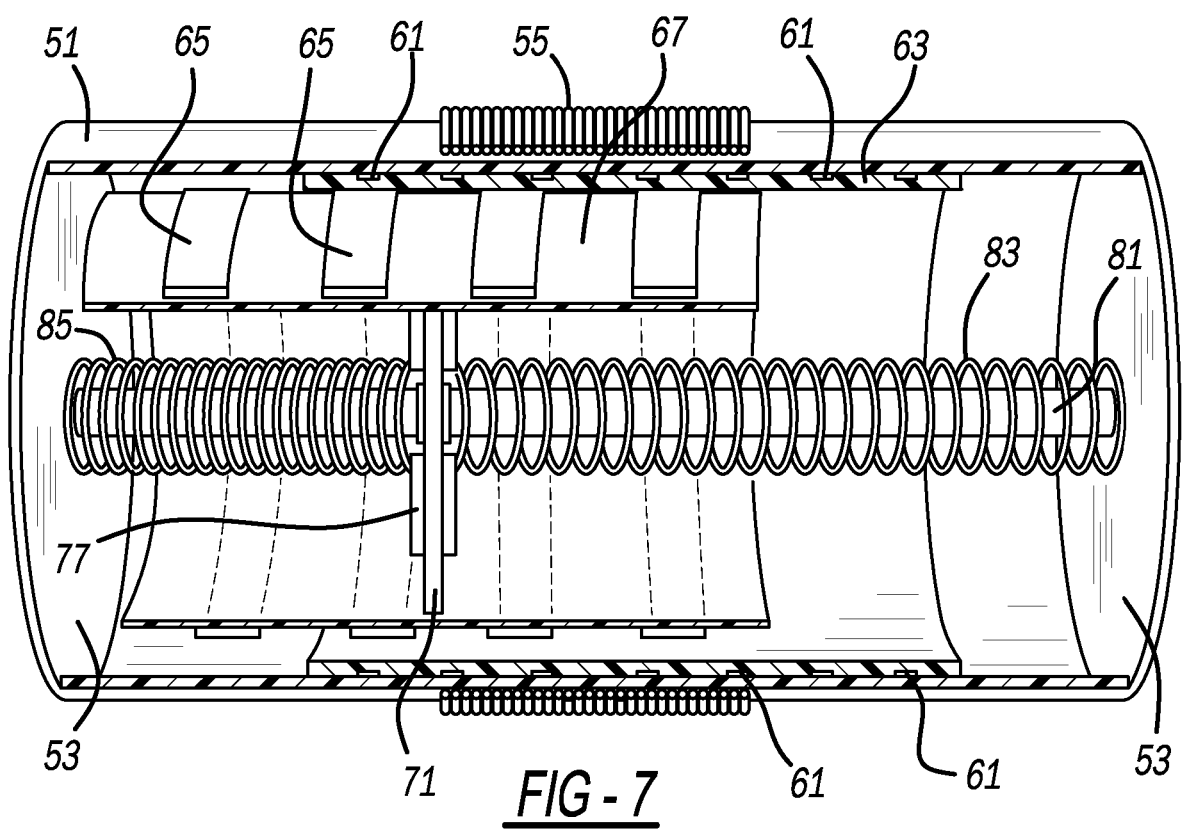
FIGS. 7 and 8 are fragmentary perspective views showing different movement positions of the present apparatus.
Figure 8:
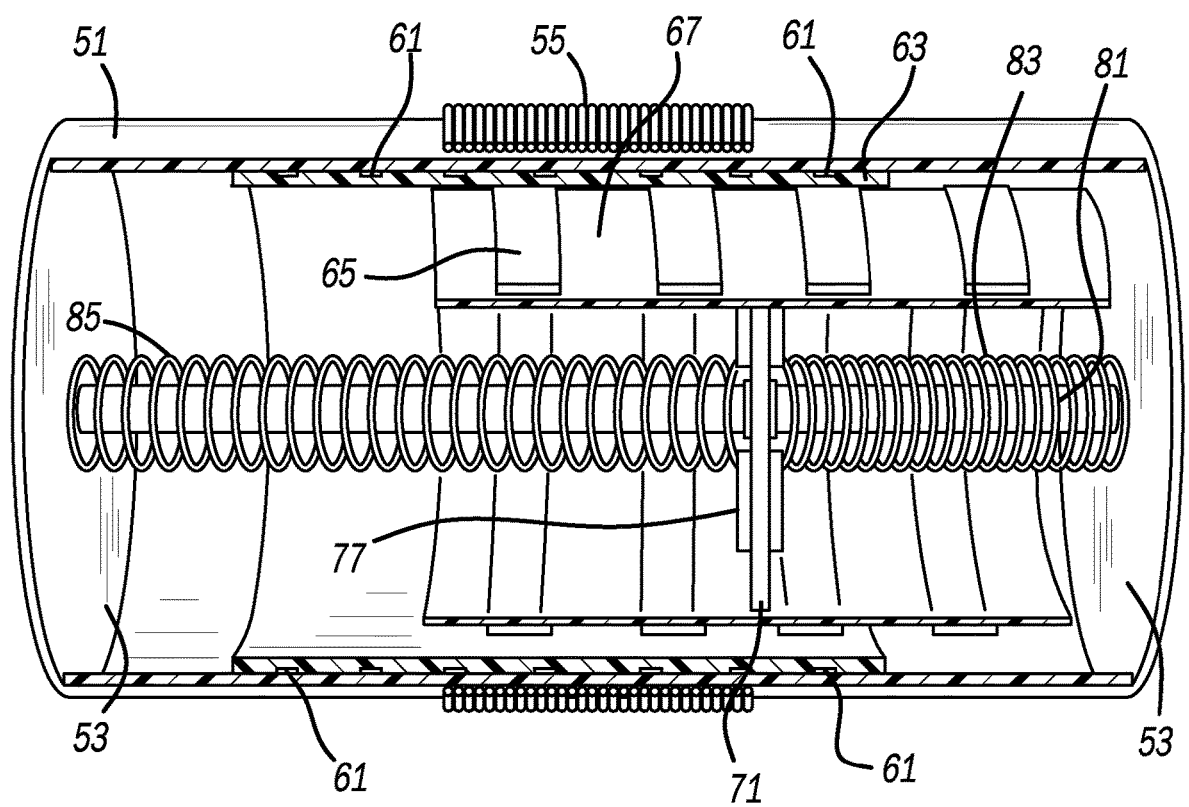

The working principle of the present HS-TENG apparatus 21 is based on a freestanding mode of synergistically combined contact triboelectrification and electrostatic induction. Wave motion causes rocking movement of housing 51 which, in turn causes oscillating and resonating back and forth linear movement of plate 71 relative to the housing. The longitudinal movement of plate 71 compresses one spring while allowing extension of the opposite spring, as can be observed by comparing FIGS. 7 and 8.

Collar 67 and its attached electrodes 65 move back and forth with plate 71, such that moving electrodes 65 move relative to stationary electrodes 61. Nevertheless, at least a portion of the electrodes 61 and 65 overlap in all movement positions. PTFE layer 67 acts as a frictional static creator during this movement such that the electrodes will receive opposite electrical charges (+ or −). As the plate and moving electrodes move back and forth under actuation (due to wave motion), the negative charges on its surface tribologically induce positive charges to flow between the stationary electrodes through external electrical circuit 101 (see FIG. 9).

It is noteworthy that the external actuation induced motion of plate 71 also causes magnets 77 to linearly move back and forth within outer wire windings 55. This electromagnetically generates electrical current in the wire windings which is also transmitted through external electrical circuit 101. Therefore, the present apparatus synergistically uses the oscillating plate movement to generate both EM and TENG power.

The present hybrid EM-TENG apparatus is ideally suited for harvesting energy from wave actuation in order to self-power environmental monitoring sensors, including characteristics such as temperature, water pollution, salinity, wave amplitude, wave frequency, wave height, and the like. The sensors are powered by kinetic energy to continuously monitor, record and report water characteristics. Alternately, the present apparatus may self-power other electronic outputs such as watercraft guidance networks or beacons, such as to warn of obstructions if attached to a floating buoy or electrically connected to a stationary tower.

Finally, the present EM-TENG apparatus 21 may alternately be used as a wearable generator or self-powered sensor. An array of the apparatus can be attached to a user wearable garment, such as a shirt, jacket, pants, shoes, a belt, headwear, wrist band, backpack or the like. Moreover, the EM-TENG apparatus may power a wearable or carriable electronic device unit such as a watch, light, communication device, medical monitor or the like While various features of the present invention have been disclosed, it should be appreciated that other variations can be employed. For example, a greater or smaller quantity of electrodes, magnets or windings may be employed, however, certain benefits may not be achieved. As another example, different electrical circuitry may be provided, although certain advantages may not be realized. It is also envisioned that the present apparatus can be secured within water or other moveable fluids in manners other than that disclosed herein, but some benefits may not be obtained. Materials other than copper, PTFE and ABS can be employed but certain advantages may not be realized. It should be appreciated that features of one embodiment may be interchanged with features of another embodiment in any combination and order, and the claims may be multiply dependent upon each other and in any combination. Variations are not to be regarded as a departure from the present disclosure and all such modifications are intended to fall within the scope and spirit of the present invention.

The invention claimed is:

1. A power generator apparatus comprising: (a) an enclosed housing; (b) at least one stationary and annular electrode affixed to the housing; (c) at least one movable and annular electrode concentrically located within the stationary electrode; (d) a plate transversely extending within the housing and being located within a hollow central area of the movable electrode; (e) at least one spring biasing the plate away from ends of the housing; (f) at least one magnet attached to and moveable with the plate, the at least one magnet extending through at least one aperture in the plate with a North end of the at least one magnet on a first side of the plate and an opposite South end of the at least one magnet on a second side of the plate; and (g) the plate being linearly movable in response to movement of the housing which causes the movable electrode to move along a longitudinal direction, which are configured to generate both triboelectric and electromagnetic energy.

2. The power generator apparatus of claim 1, further comprising:
a cylindrically shaped collar mounted to an edge of the plate, the collar and plate longitudinally moving together within the housing; and
the movable electrode, being at least three spaced apart and coaxial electrodes, being mounted to the collar.

3. The power generator apparatus of claim 2, wherein the plate includes a polymeric and electrically insulating material, and the collar includes PTFE material such that movement of the collar within the stationary electrode creates frictional static which induces triboelectric charges to flow to the stationary electrode.

4. The power generator apparatus of claim 1, further comprising:
additional housings, each including stationary electrodes affixed to the associated housing, movable electrode within the stationary electrodes, a longitudinally movable plate, at least one spring biasing the plate, and a magnet attached to the plate;
each of the housings being elongated in the longitudinal direction;
at least some of the housings having their ends attached to together along the longitudinal direction to create a modularized assembly of at least three of the housings; and
electrical lines connected to the electrodes of each of the housings to transmit electricity generated therefrom when the modularized assembly is moved by water waves, the water waves causing the magnet to longitudinally move within the stationary electrode and causing the movable electrode to longitudinally move within the stationary electrode.

5. The power generator apparatus of claim 4, wherein multiple parallel bundles of the modularized assemblies are stacked in offset angled layers, the housing having a flat central portion on each of the ends adjacent the at least one spring, and electricity being generated by the apparatus due to frequencies of the water waves including those of less than 3 Hz wave energy.

6. The power generator apparatus of claim 1, further comprising:
a longitudinally elongated shaft extending through a hole in the plate, the plate being slidable along the shaft with a bearing between the plate and the shaft; and
the at least one spring including two helically coiled springs surrounding the shaft on opposite sides of the plate.

7. The power generator apparatus of claim 1, wherein the at least one magnet includes more than two spaced apart permanent magnets, each extending through apertures in the plate, a majority of the plate is flat, with the magnets being radially spaced between a central hole and a peripheral edge of the plate, the edge is circular.

8. The power generator apparatus of claim 1, wherein the stationary electrode, the movable electrode and the magnet are part of a self-powered sensor, and the housing and the plate are polymeric.

9. The power generator of claim 1, further comprising a wire winding conductor or metallic strip conductor concentrically mounted to an exterior of the housing with an insulating portion of the housing being located between the conductor and the stationary electrode, the conductor being encased within a nonconductive coating, and a dielectric polymeric layer secured to an inner surface of the stationary electrode, the dielectric polymeric layer being located between the stationary and movable electrodes.

10. A power generator apparatus comprising: (a) a housing being elongated in a longitudinal direction between end walls thereof; (b) multiple, longitudinally spaced apart and annular first electrodes affixed to the housing; (c) multiple, longitudinally spaced apart and movable second electrodes located within a hollow space internal to the first electrodes; (d) multiple magnets being moveable within the hollow space, the magnets being laterally spaced apart from each other; (e) at least one spring biasing the magnets relative to the end walls of the housing; (f) a plate transversely extending within the housing and being located within the hollow space, magnets attached to and moveable with the plate; (g) a cylindrically shaped collar mounted to an edge of the plate, the collar and plate longitudinally moving together within the housing; and (h) the second electrodes and the magnets being linearly movable together along the longitudinal direction in response to movement of the housing, which are configured to generate both triboelectric and electromagnetic energy due to the movement.

11. The power generator apparatus of claim 10, wherein:
the plate is movable with the second electrodes when the second electrodes longitudinally move relative to the first electrodes which are located internal to the housing;
the at least one spring includes two compression springs which contact against opposite sides of the plate, the springs also contacting against the end walls of the housing;
the end walls of the housing are enclosed and substantially flat; and
the housing and the plate are polymeric.

12. The power generator apparatus of claim 11, wherein:
the second electrodes, being at least three longitudinally spaced apart and coaxial electrodes, are mounted to an outer surface of the collar.

13. The power generator apparatus of claim 10, further comprising:
a cylindrical collar upon which the second electrodes are mounted;
a plate internally connected to and movable with the collar;
the magnets being coupled to the plate;
the plate including a polymeric and electrically insulating material; and
the collar including a dielectric material such that movement of the collar within the first electrodes creates frictional static which induces triboelectric charges.

14. The power generator apparatus of claim 10, further comprising:
additional housings, each including electrodes affixed to the associated housing, movable electrodes, a longitudinally movable plate, at least one spring biasing the plate, and magnets attached to the plate;
each of the housings being elongated in the longitudinal direction;
at least three of the housings being attached together along the longitudinal direction to create a modularized assembly of at least three of the housings; and
electrical lines connected to the electrodes of each of the housings to transmit electricity generated therefrom when the modularized assembly is moved by water waves.

15. The power generator apparatus of claim 10, further comprising:
a surface laterally projecting within the second electrodes;
a longitudinally elongated shaft extending through a hole in the surface, the surface being slidable along the shaft; and
the apparatus being configured to generate electricity due to movement frequencies of water waves including those of less than 3 Hz wave energy.

16. A power generator apparatus comprising:
(a) a water wave-tiltable enclosure being elongated in a longitudinal direction;
(b) multiple, longitudinally spaced apart first electrodes affixed to the enclosure;
(c) a collar longitudinally movable relative to the first electrodes within the enclosure, the collar including a dielectric material;
(d) multiple, longitudinally spaced apart second electrodes mounted to the collar;
(e) at least one spring biasing the collar relative to longitudinal ends of the enclosure;
(f) a plate transversely extending within the collar;
(g) the plate being movable with the collar and the second electrodes when the second electrodes longitudinally move internal to the first electrodes; and
(h) the first and second electrodes being configured to generate triboelectric energy due to water wave-tilting of the enclosure.

17. The power generator apparatus of claim 16, further comprising:
the at least one spring includes two compression springs which contact against opposite sides of the plate;
the enclosure being enclosed, buoyant and made from a polymeric material; and
spaced apart magnets mounted to the plate and being configured to generate electromagnetic energy due to the water wave-tilting of the enclosure; and
multiples of the enclosure being coupled together in a linear and lontigudinally stacked column, each of the multiples of the enclosure comprising the first electrodes, the second electrodes, the collar, and the plate.

18. The power generator apparatus of claim 17, further comprising:
a wire winding conductor or metallic strip conductor concentrically mounted to the enclosure with an insulating portion of the housing being located between the conductor and the first electrodes; and
a dielectric polymeric layer secured to an inner surface of the first electrodes, the dielectric polymeric layer being located between the first and the second electrodes.

19. The power generator apparatus of claim 16, further comprising:
more than two permanent magnets mounted through apertures in the plate such that the magnets are longitudinally movable with the plate and the collar;
the magnets being radially spaced between a central axis and an outer periphery of the plate; and
the plate including a polymeric material.

20. The power generator apparatus of claim 19, further comprising:
a longitudinally elongated shaft extending through a hole in the plate, the plate being slidable along the shaft with a bearing located between the plate and the shaft;
the at least one spring including two helically coiled springs surrounding the shaft on opposite sides of the plate; and
an electrical circuit connected to the first electrodes, the electrical circuit comprising an AC-DC converter, a capacitor and diodes.

* * * * *